United States Patent
Czajkowski et al.

(10) Patent No.: US 6,799,173 B2
(45) Date of Patent: Sep. 28, 2004

(54) METHOD AND APPARATUS FOR SHARING CODE CONTAINING REFERENCES TO NON-SHARED OBJECTS

(75) Inventors: Grzegorz J. Czajkowski, Mountain View, CA (US); Laurent P. Daynes, Sunnyvale, CA (US); Nathaniel J. Nystrom, Ithaca, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 367 days.

(21) Appl. No.: 10/102,322

(22) Filed: Mar. 19, 2002

(65) Prior Publication Data

US 2003/0093487 A1 May 15, 2003

Related U.S. Application Data

(60) Provisional application No. 60/332,924, filed on Nov. 14, 2001.

(51) Int. Cl.[7] .............................................. G06F 17/30
(52) U.S. Cl. ......................................... 707/2; 707/101
(58) Field of Search ................................. 707/2, 10, 101, 707/103 R; 345/174, 733; 705/28; 709/201, 206, 223, 229; 713/2; 714/38; 717/130, 136, 139, 148; 719/315, 316, 331, 310

(56) References Cited

U.S. PATENT DOCUMENTS

| | | | | |
|---|---|---|---|---|
| 6,067,577 A | * | 5/2000 | Beard | 719/331 |
| 6,216,237 B1 | * | 4/2001 | Klemm et al. | 714/38 |
| 6,519,605 B1 | * | 2/2003 | Gilgen et al. | 707/103 R |
| 6,584,487 B1 | * | 6/2003 | Saboff | 718/100 |
| 6,728,963 B1 | * | 4/2004 | Forin et al. | 719/310 |

* cited by examiner

Primary Examiner—Diane D. Mizrahi
Assistant Examiner—Apu M Mofiz
(74) Attorney, Agent, or Firm—Park, Vaughan & Fleming, LLP

(57) ABSTRACT

A system is described that facilitates sharing an object containing embedded references to non-shared objects, which may be located at different virtual memory addresses in different processes. During operation, the system looks up the object in a shared memory area, wherein the shared memory area is mapped to the same virtual address by all sharing processes. If the object does not exist in the shared memory area, the system creates the object within the shared memory area, and sets embedded references in the object to point to entries in an indirection table located at a second virtual address, wherein each sharing process maintains its own private version of the indirection table at the same second virtual address. Next, the system performs a private initialization operation on the object for a specific process by setting references in the private version of the indirection table for the specific process to point to non-shared objects located in a private memory area for the specific process. In this way, the system allows each sharing process to maintain its own private versions of the non-shared objects.

27 Claims, 3 Drawing Sheets

METHOD AND APPARATUS FOR SHARING CODE CONTAINING REFERENCES TO NON-SHARED OBJECTS

This application hereby claims priority under 35 U.S.C. §119 to U.S. Provisional Patent Application No. 60/332,924, filed on Nov. 14, 2001, entitled "Sharing Meta-Data Across Instances of a Language Run-Time System," by inventors Grzegorz J. Czajkowski and Laurent P. Daynes.

BACKGROUND

1. Field of the Invention

The present invention relates to operating systems for computers. More specifically, the present invention relates to a method and an apparatus that facilitates sharing objects between multiple processes, wherein the objects contain embedded references to non-shared objects.

2. Related Art

The idea of sharing executable code among operating system processes gained widespread acceptance in mid-1980s, with the introduction of shared libraries. The use of shared libraries lowers the system-wide memory footprint and enables faster application start-up. Moreover, providing support for sharing libraries at the operating system level frees programmers from having to code the sharing themselves. Today, shared libraries are an entrenched concept, available in optimized forms in most operating systems.

As a result of the popularity of the Java™ programming language, many computers have the Java virtual machine (JVM™) installed on them. (The terms "Sun Microsystems", "Java", "Java virtual machine" and "JVM" are trademarks or registered trademarks of Sun Microsystems, Inc. in the United States and other countries.) Each such computer may be running many Java applications at any given time. One may ask whether in these settings the concept of sharing executable code (which in the context of the JVM includes runtime representation of classes, methods, their bytecodes, and compiled code of methods generated by a just-in-time or dynamic compiler) across multiple virtual machines might be as beneficial for the scalability of the JVM as the notion of shared libraries has been for operating systems.

Several characteristics of the Java programming language and of the JVM make sharing of executable code challenging. First, dynamic class loading makes the granularity of sharable unit small—at most a class. Second, the size and format of executable code evolve during program execution as the JVM identifies target methods for optimizations and compiles selected methods. Third, executable code is often intertwined with the runtime state of a program. For example, references to objects subject to garbage collection are often embedded in executable code.

Despite these challenges, sharing of metadata remains attractive because of its potential to decrease the memory footprint of virtual machines and to factor out costs related to on-demand class loading (e.g., parsing, verification, dynamic link resolution) and to architecture neutrality of class files (e.g., runtime quickening of interpreted code and runtime compilations).

What is needed is method and an apparatus that facilitates sharing code between multiple virtual machines and/or processes in a manner that efficiently deals with the above-described challenges.

SUMMARY

One embodiment of the present invention provides a system that facilitates sharing an object containing embedded references to non-shared objects, which may be located at different virtual memory addresses in different processes. During operation, the system looks up the object in a shared memory area, wherein the shared memory area is mapped to the same virtual address by all sharing processes. If the object does not exist in the shared memory area, the system creates the object within the shared memory area, and sets embedded references in the object to point to entries in an indirection table located at a second virtual address, wherein each sharing process maintains its own private version of the indirection table at the same second virtual address. Next, the system performs a private initialization operation on the object for a specific process by setting references in the private version of the indirection table for the specific process to point to non-shared objects located in a private memory area for the specific process. In this way, the system allows each sharing process to maintain its own private versions of the non-shared objects.

In a variation on this embodiment, setting embedded references in the object to point to entries in the indirection table involves first allocating space in the indirection table for the embedded references.

In a variation on this embodiment, prior to looking up the object, the system initializes the shared memory area so that the shared memory area can be accessed by all sharing processes. The system also ensures that all sharing processes map the shared memory area to the same first virtual address. It also ensures that all sharing processes map their private versions of the indirection table to the same second virtual address.

In a variation on this embodiment, the object includes a software component.

In a variation on this embodiment, the object includes class metadata. In this variation, the object lookup takes place during a dynamic class loading process.

In a variation on this embodiment, the object includes a compiled method that is compiled from platform-independent code into processor native code. In this variation, the object lookup takes place during a dynamic compilation process.

In a variation on this embodiment, each of the sharing processes executes a separate instance of a platform-independent virtual machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
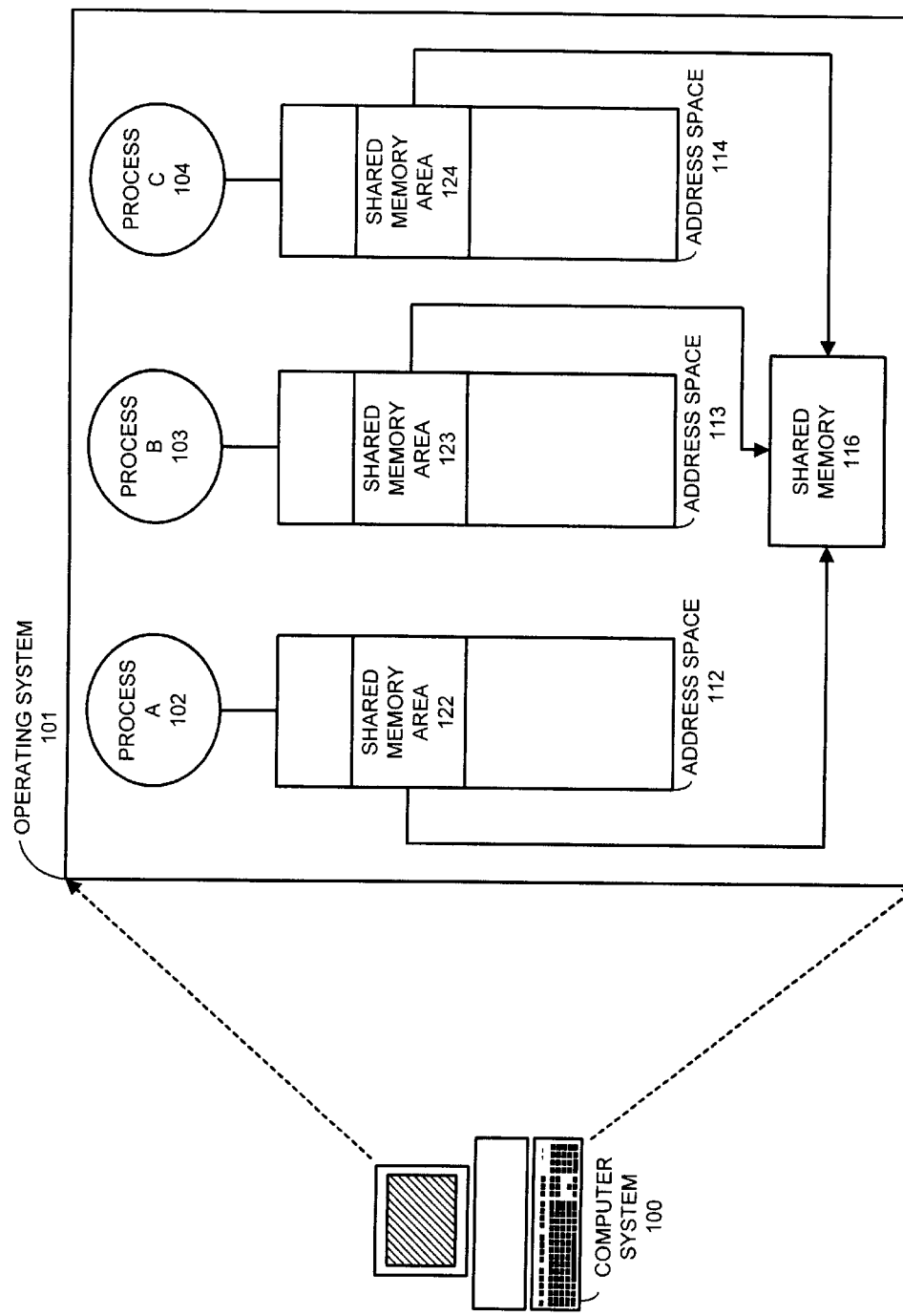
FIG. 1 illustrates a computer system in accordance with an embodiment of the present invention.

FIG. 1 illustrates a computer system 100 in accordance with an embodiment of the present invention. Computer system 100 can generally include any type of computer system that can support multiple processes, including, but not limited to, a computer system based on a microprocessor, a mainframe computer, a digital signal processor, a portable computing device, a personal organizer, a device controller, and a computational engine within an appliance. Computer system 100 can also include any type of computer system that supports shared memory communication between parallel processors, such as a multiprocessor system or certain types of distributed computer systems.

Computer system 100 contains an operating system 101, which supports a number of processes 102–104 that communicate through shared memory 116. Each of these processes 102–104 operates within its own virtual address space. In particular, process A 102 operates on address space 112, process B 103 operates on address space 113, and process C 104 operates on address space 114.

Note that each address space includes a corresponding shared memory area. More specifically, address space 112 includes shared memory area 122, address space 113 includes shared memory area 123, and address space 114 includes shared memory area 124. Furthermore, each of these shared memory areas 122–124 maps to the same region of shared memory 116. In this way, changes made by any of the processes 102–104 to their respective shared memory areas 122–124 become visible to the other processes in their shared memory areas. In one embodiment of the present invention, shared memory 116 is implemented as a memory-mapped file.

Process Address Spaces

Figure 2:
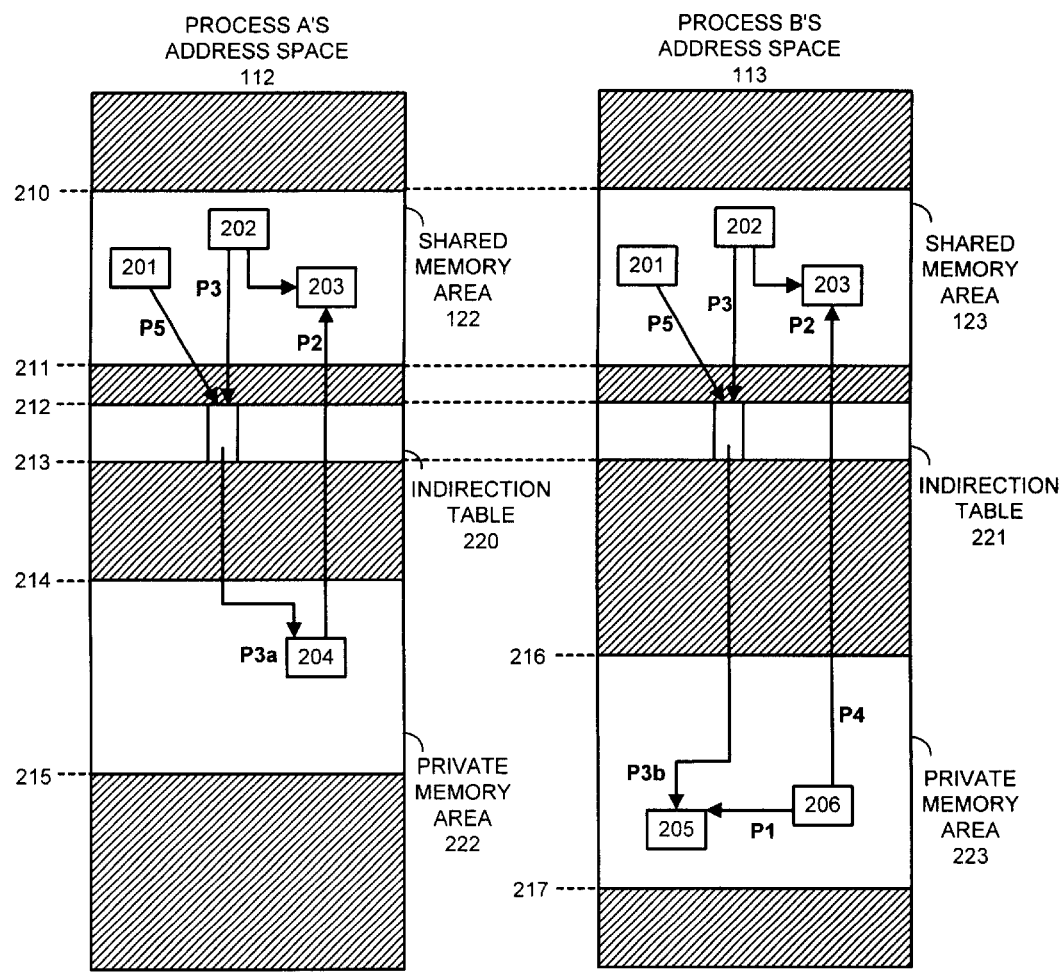
FIG. 2 illustrates two exemplary process address spaces that include shared memory areas in accordance with an embodiment of the present invention.

FIG. 2 illustrates two exemplary process address spaces 112–113 in accordance with an embodiment of the present invention. As is illustrated in FIG. 2, address space 112 includes a shared memory area 122, an indirection table 220 and a private memory area 222. Similarly, address space 113 includes a shared memory area 123, an indirection table 221 and a private memory area 223. Moreover, the shared memory areas 122–123 are located at the same virtual address for all processes, and the indirection tables 220–221 are also located at the same virtual address for all processes. However, note that indirection tables 220–221 are located in private regions of their respective address spaces 112–113. This allows each process to have its own private version of the indirection table that can be used to reference its own non-shared objects.

Shared memory 116 holds objects that are shared across all processes. Private memory areas 222–223 contain data items that are private to a process, including the garbage-collected heap (when present) and the stacks of its threads (when present). Objects in any area can reference objects in shared memory 116 directly, using their virtual memory addresses (e.g., $p_2$, and $p_4$ in FIG. 2).

Similarly, objects in a private memory area of a process can directly reference objects in the private area of the same process (e.g., $p_1$). However, no data structure in the shared memory area can reference an object in a private memory area directly (e.g., $p_{3a}$, in process A, or $P_{3b}$ in B), since the virtual memory address of the object does not in general correspond to the same object in virtual address spaces for different processes.

Indirection tables 220–221 address this problem by allowing objects from the shared memory area to indirectly reference objects in private memory areas 222–223 through entries in indirection tables 220–221. Entries in indirection tables 220–221 hold the virtual addresses to corresponding objects in private memory areas 222–223 (i.e., the entry referenced by $p_3$ holds the virtual memory address of $p_{3a}$ in process A and of $p_{3b}$ in process B). This way, only virtual memory addresses that are valid across all processes are stored in shared objects. Shared-to-private pointers are created as needed when data items are stored in the shared memory area. A process, which gets a pointer to a shared object and needs to access it for the first time, sets corresponding pointers in the indirection table to point to its copies of private objects that are referenced by the shared object. Such cases can be detected by encountering the null value in the indirection table entry.

Note that a garbage collector can relocate a private object referenced from the shared area independently of other processes by updating an entry in its copy of the indirection table. Moreover, the above-described solution leverages virtual memory to efficiently support a one-to-many mapping between shared and private data.

One embodiment of the present invention provides appropriate locks to protect initialization, updates and lookups in the shared area. When a process holding a lock on a shared resource crashes, the system ensures that the other processes do not block forever waiting for the lock to be freed. This can be accomplished by using an atomic compare-and-swap instruction executed on shared variables. To acquire a lock, the identifier of the locking process is atomically stored in the lock variable if the lock is not held by another process. The process will spin, yielding the processor, until the lock is available, and will occasionally check whether the process holding the lock is alive.

Shared Memory and Process Initialization

Figure 3:
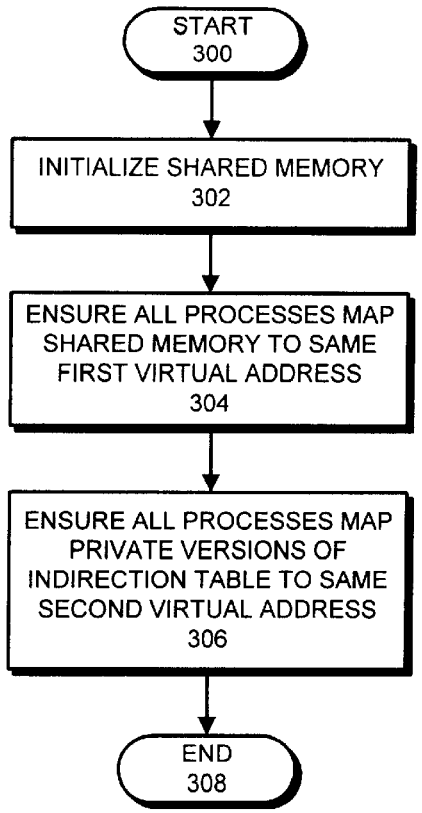
FIG. 3 is a flow chart illustrating how both shared memory and process address spaces are initialized in accordance with an embodiment of the present invention.

FIG. 3 is a flow chart illustrating how both shared memory and process address spaces are initialized in accordance with an embodiment of the present invention. The system starts by initializing shared memory 116 so that it is accessible by all processes (step 302). Next, the system ensures that all processes 102–104 map shared memory 116 to the same virtual address in their respective address spaces 112–114 (step 304). The system also ensures that all processes map their private versions of the indirection table to the same virtual address (step 306).

Shared Object Initialization

Figure 4:
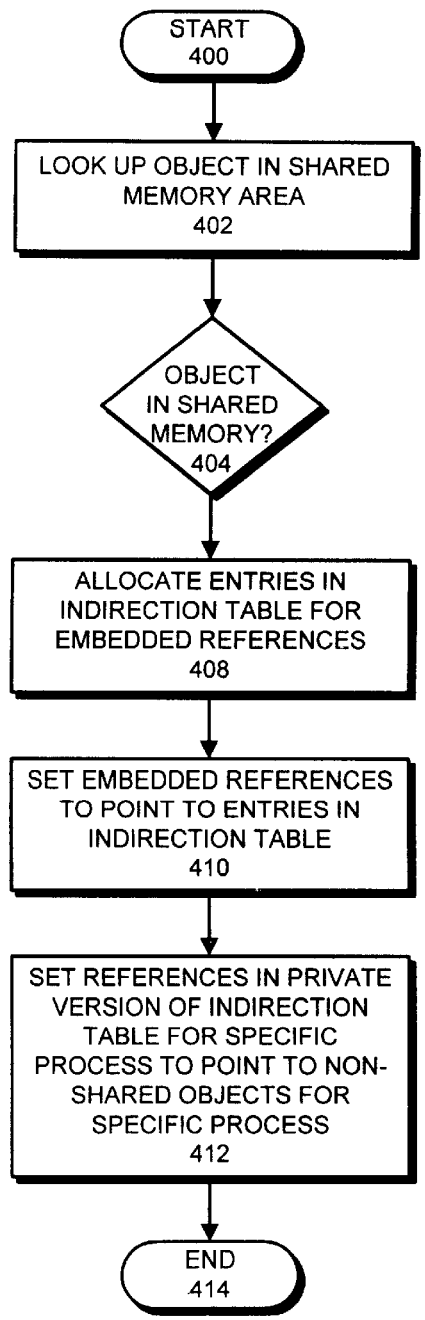
FIG. 4 is a flow chart illustrating how a shared object is initialized in accordance with an embodiment of the present invention.

FIG. 4 is a flow chart illustrating how an object is initialized in the shared memory area in accordance with an embodiment of the present invention. The system starts by looking up the object in the shared memory area (step 402) to determine if the object is already present in the shared memory area (step 404). If not, the system creates the object within the shared memory area (step 406). The system also allocates entries in the indirection table to accommodate shared-to-private pointers for embedded references in the object (step 408). Next, the system sets embedded references within the object to point to entries in the indirection table (step 410). For example, in FIG. 2, the system sets pointers $p_3$ and $p_5$ to point to an entry in the indirection table.

Next, after the object is created in the shared memory area, or if the object already exists in the shared memory area, the system performs a private initialization for a specific process. This involves setting references in the specific instance of the indirection table to point to non-shared objects for the specific process located in the private memory area for the specific process (step 412). For example, in FIG. 2, the system sets pointers $p_{3a}$ to point to object 204 in private memory area 222.

Note that in one embodiment of the present invention, the object is a compiled method. In this embodiment, the lookup at step 402 occurs during a dynamic compilation operation, and the process of creating the object at step 406 involves compiling the object from platform-independent code into processor native code.

In another embodiment of the present invention, the object is part of a runtime representation of a class. In order to share the runtime representation of a class, (i) the shareable components of this representation are identified and (ii) a mechanism for creating, maintaining and accessing the non-sharable part corresponding to a given program execution is devised. Most of the runtime representation of a class is already independent from any particular execution context, and can therefore be shared as is. This sharable portion of a class includes the pool of constants and symbols, debugging information, the descriptions of methods and fields, including information resolved at runtime such as the offset of an instance variable from the beginning of an object or the index of a method in a virtual table, and, given appropriate changes to the interpreter, the bytecode of methods. The runtime constant pool cache (a subset of the runtime constant pool optimized for use by both the interpreter and code produced by the runtime compiler) can also be shared after minor modifications.

Data that cannot be shared across program execution contexts, i.e., the task-dependent data, is relatively small. It includes the storage for static variables, the objects that constitute the program-visible representation of classes, e.g., instance of java.lang.Class and other relevant objects (e.g., class loader, signers, etc.), and data describing the initialization state of the class.

Although the present invention is described in the context of the Java programming language and Java virtual machines, the present invention is not limited to systems that implement the Java programming language and Java virtual machines. In general, the present invention can be applied to any situation in which a shared object contains references to non-shared objects whose virtual addresses can be different in different processes, whether or not the shared object contains code.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates sharing an object containing embedded references to non-shared objects, comprising:

looking up the object in a shared memory area, wherein the shared memory area is mapped to the same first virtual address by all sharing processes;

if the object does not exist in the shared memory area, creating the object within the shared memory area, and setting embedded references in the object to point to entries in an indirection table located at a second virtual address;

wherein each sharing process maintains its own private version of the indirection table located at the same second virtual address; and performing a private initialization operation on the object for a specific process by setting references in the private version of the indirection table for the specific process to point to non-shared objects located in a private memory area for the specific process;

whereby each sharing process can maintain its own private versions of the non-shared objects.

2. The method of claim 1, wherein setting embedded references in the object to point to entries in the indirection table involves first allocating space in the indirection table for the embedded references.

3. The method of claim 1, wherein prior to looking up the object, the method further comprises:

initializing the shared memory area so that the shared memory area can be accessed by all sharing processes;

ensuring that all sharing processes map the shared memory area to the same first virtual address; and ensuring that all sharing processes map their private versions of the indirection table to the same second virtual address.

4. The method of claim 1, wherein the object includes a software component.

5. The method of claim 1, wherein the object includes class metadata.

6. The method of claim 5, wherein the object lookup takes place during a dynamic class loading process.

7. The method of claim 1, wherein the object includes a compiled method that is compiled from platform-independent code into processor native code.

8. The method of claim 7, wherein the object lookup takes place during a dynamic compilation process.

9. The method of claim 1, wherein each of the sharing processes executes a separate instance of a platform-independent virtual machine.

10. A computer-readable storage medium storing instructions that when executed by a computer cause the computer to perform a method that facilitates sharing an object containing embedded references to non-shared objects, the method comprising:

looking up the object in a shared memory area, wherein the shared memory area is mapped to the same first virtual address by all sharing processes;

if the object does not exist in the shared memory area, creating the object within the shared memory area, and setting embedded references in the object to point to entries in an indirection table located at a second virtual address;

wherein each sharing process maintains its own private version of the indirection table located at the same second virtual address; and performing a private initialization operation on the object for a specific process by setting references in the private version of the indirection table for the specific process to point to non-shared objects located in a private memory area for the specific process;

whereby each sharing process can maintain its own private versions of the non-shared objects.

11. The computer-readable storage medium of claim 10, wherein setting embedded references in the object to point to entries in the indirection table involves first allocating space in the indirection table for the embedded references.

12. The computer-readable storage medium of claim 10, wherein prior to looking up the object, the method further comprises:

initializing the shared memory area so that the shared memory area can be accessed by all sharing processes;

ensuring that all sharing processes map the shared memory area to the same first virtual address; and ensuring that all sharing processes map their private versions of the indirection table to the same second virtual address.

13. The computer-readable storage medium of claim 10, wherein the object includes a software component.

14. The computer-readable storage medium of claim 10, wherein the object includes class metadata.

15. The computer-readable storage medium of claim 14, wherein the object lookup takes place during a dynamic class loading process.

16. The computer-readable storage medium of claim 10, wherein the object includes a compiled method that is compiled from platform-independent code into processor native code.

17. The computer-readable storage medium of claim 16, wherein the object lookup takes place during a dynamic compilation process.

18. The computer-readable storage medium of claim 10, wherein each of the sharing processes executes a separate instance of a platform-independent virtual machine.

19. An apparatus that facilitates sharing an object containing embedded references to non-shared objects, comprising:

a computer system that supports multiple sharing processes that can share the object;

a shared memory area that is mapped to the same first virtual address by all sharing processes;

wherein each sharing process maintains its own private version of an indirection table located at the same second virtual address;

a lookup mechanism that is configured to look up the object in the shared memory area;

an object creation mechanism, wherein if the object does not exist in the shared memory area, the object creation mechanism is configured to, create the object in the shared memory area, and to set embedded references in the object to point to entries in the indirection table located at a second virtual address; and a private initialization mechanism that is configured to perform a private initialization operation on the object for a specific process by setting references in the private version of the indirection table for the specific process to point to non-shared objects located in a private memory area for the specific process;

whereby each sharing process can maintain its own private versions of the non-shared objects.

20. The apparatus of claim 19, wherein the object creation mechanism is configured to allocate space in the indirection table for the embedded references.

21. The apparatus of claim 19, wherein prior to the object look up, the computer system is configured to:

initialize the shared memory area so that the shared memory area can be accessed by all sharing processes;

map the shared memory area to the same first virtual address for all sharing processes; and to map private versions of the indirection table for all sharing processes to the same second virtual address.

22. The apparatus of claim 19, wherein the object includes a software component.

23. The apparatus of claim 19, wherein the object includes class metadata.

24. The apparatus of claim 19, wherein the lookup mechanism is part of dynamic class loader.

25. The apparatus of claim 19, wherein the object includes a compiled method that is compiled from platform-independent code into processor native code.

26. The apparatus of claim 25, wherein the lookup mechanism is part of dynamic compilation mechanism.

27. The apparatus of claim 19, wherein each of the sharing processes executes a separate instance of a platform-independent virtual machine.

* * * * *